United States Patent [19]

Sacristan

[11] Patent Number: 5,708,708
[45] Date of Patent: Jan. 13, 1998

[54] ANTISEPTIC TELEPHONE SET

[76] Inventor: Eduardo Fernandez Sacristan, Pelayo 78., 28004 Madrid, Spain

[21] Appl. No.: 608,271

[22] Filed: Feb. 28, 1996

Related U.S. Application Data

[63] Continuation-in-part of Ser. No. 232,060, filed as PCT/ES93/00070, Aug. 24, 1993, abandoned.

[30] Foreign Application Priority Data

Aug. 29, 1992 [ES] Spain ................................ P9201786
Apr. 27, 1993 [ES] Spain ................................ P9300891

[51] Int. Cl.$^6$ ........................................................ H04M 1/00
[52] U.S. Cl. ................................................ 379/452; 379/439
[58] Field of Search ........................................ 379/452, 439, 379/451, 437

[56] References Cited

U.S. PATENT DOCUMENTS

| | | | |
|---|---|---|---|
| 859,827 | 7/1907 | Molyneux et al. | 379/452 |
| 1,049,822 | 1/1913 | Dieterich | 379/439 |
| 2,520,416 | 8/1950 | Lewis | 379/439 |
| 4,422,402 | 12/1983 | Ogihara | 379/452 |

FOREIGN PATENT DOCUMENTS

| | | | |
|---|---|---|---|
| 2649297 | 5/1978 | Germany | 379/452 |
| 6054039 | 2/1994 | Japan | 379/439 |

*Primary Examiner*—Jack K. Chiang
*Attorney, Agent, or Firm*—Goodman & Teitelbaum, Esqs.

[57] ABSTRACT

Telephone set providing for telephone communications, and also for the cleaning and disinfecting of the speaking and hearing portions of the telephone receiver to improve the quality of life by preventing contamination by diseases, being made of plastic, and including the components of a mechanical system inside the telephone case providing for the cleaning, which includes a cassette or cartridge having two reels; a supply reel on which is wound a cleaning cloth impregnated with disinfectant liquid, and a receiving reel on which the cleaning cloth is would after it has passed across a cleaning window provided at the location of the speaking and hearing portions of the telephone receiver, which portions are cleaned by frictional contact with the cleaning cloth which is displaced manually or electrically from the one supply reel to the other receiving reel. The cassette or cartridge is either of the disposable type or of the continuous use type.

23 Claims, 13 Drawing Sheets

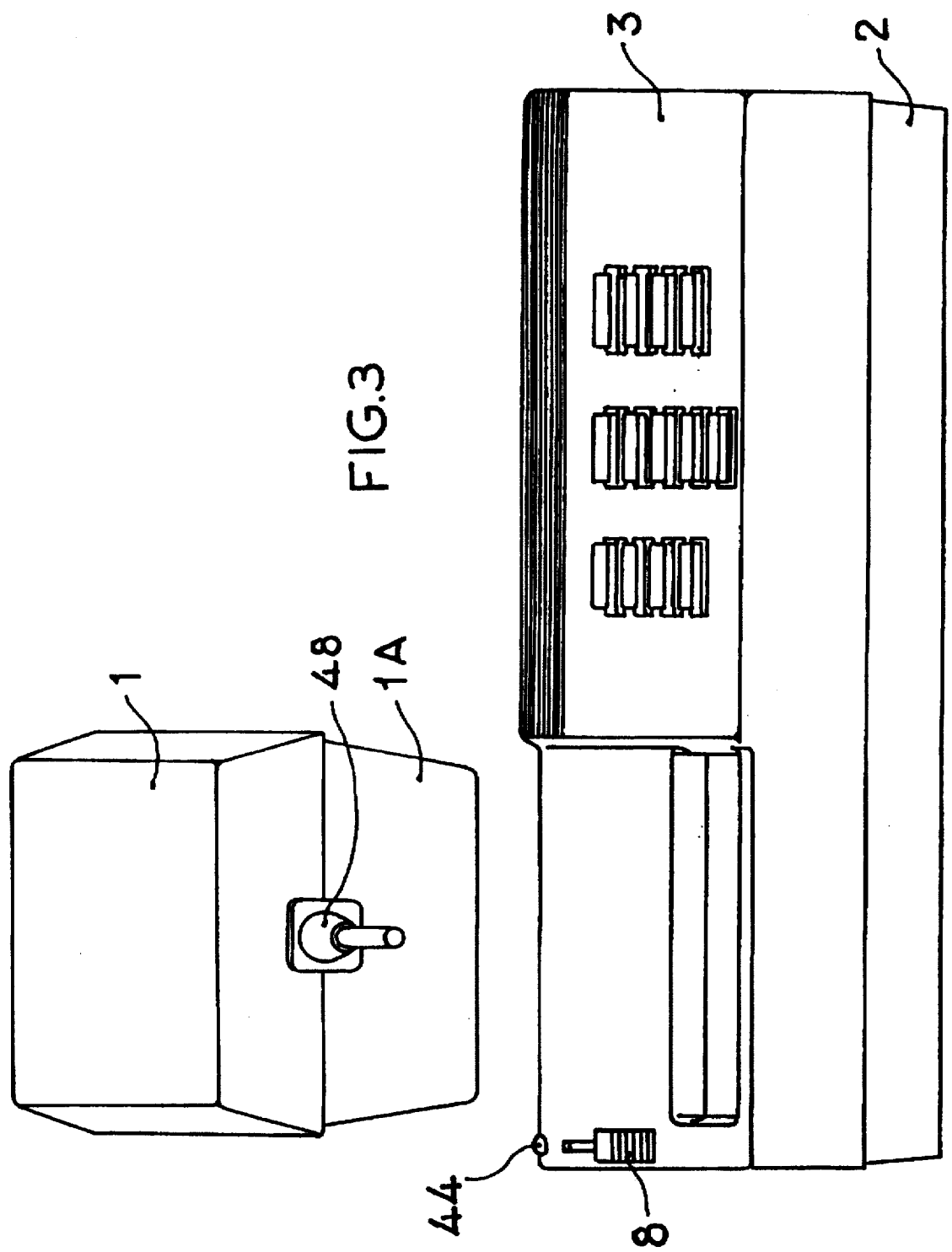

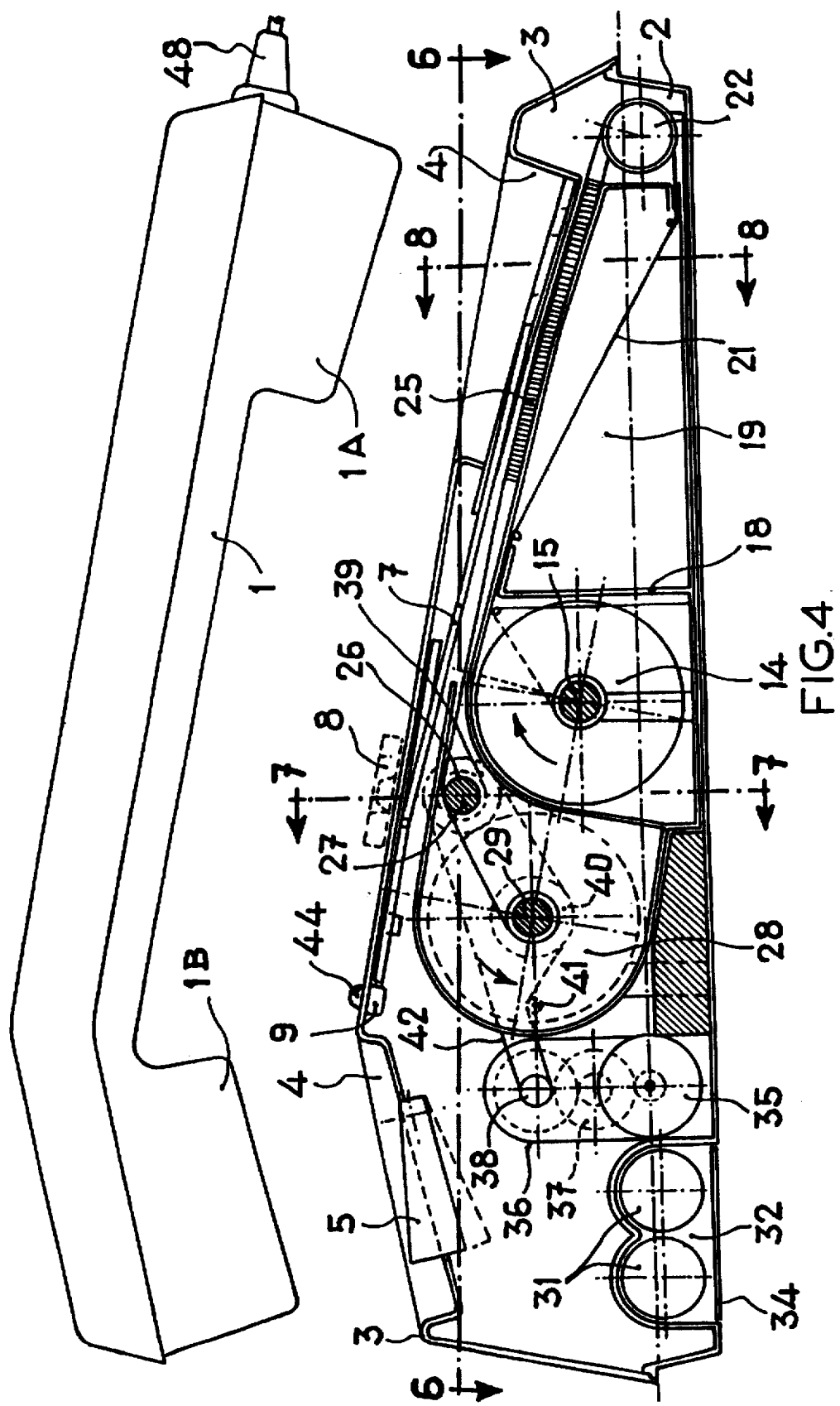

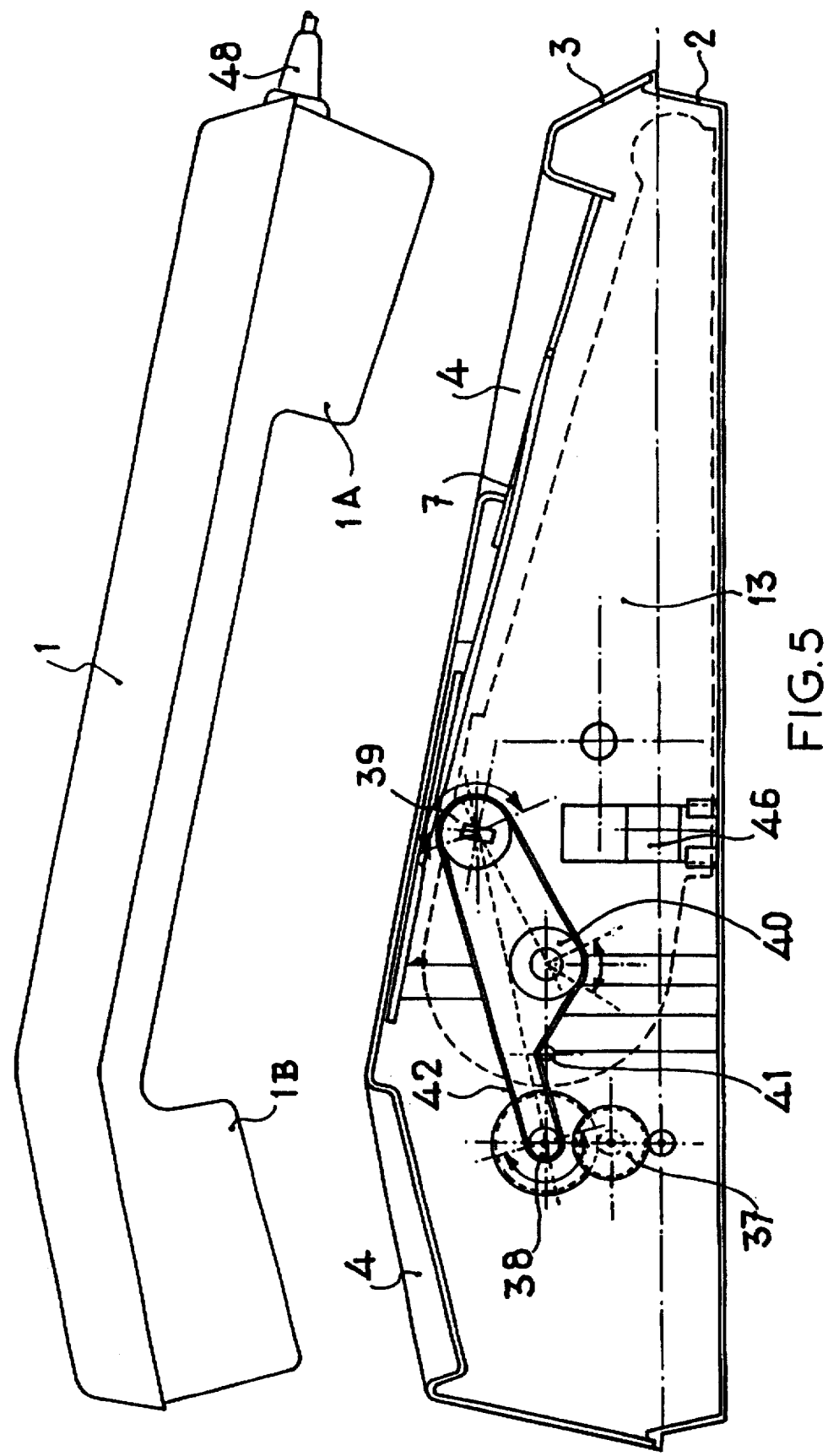

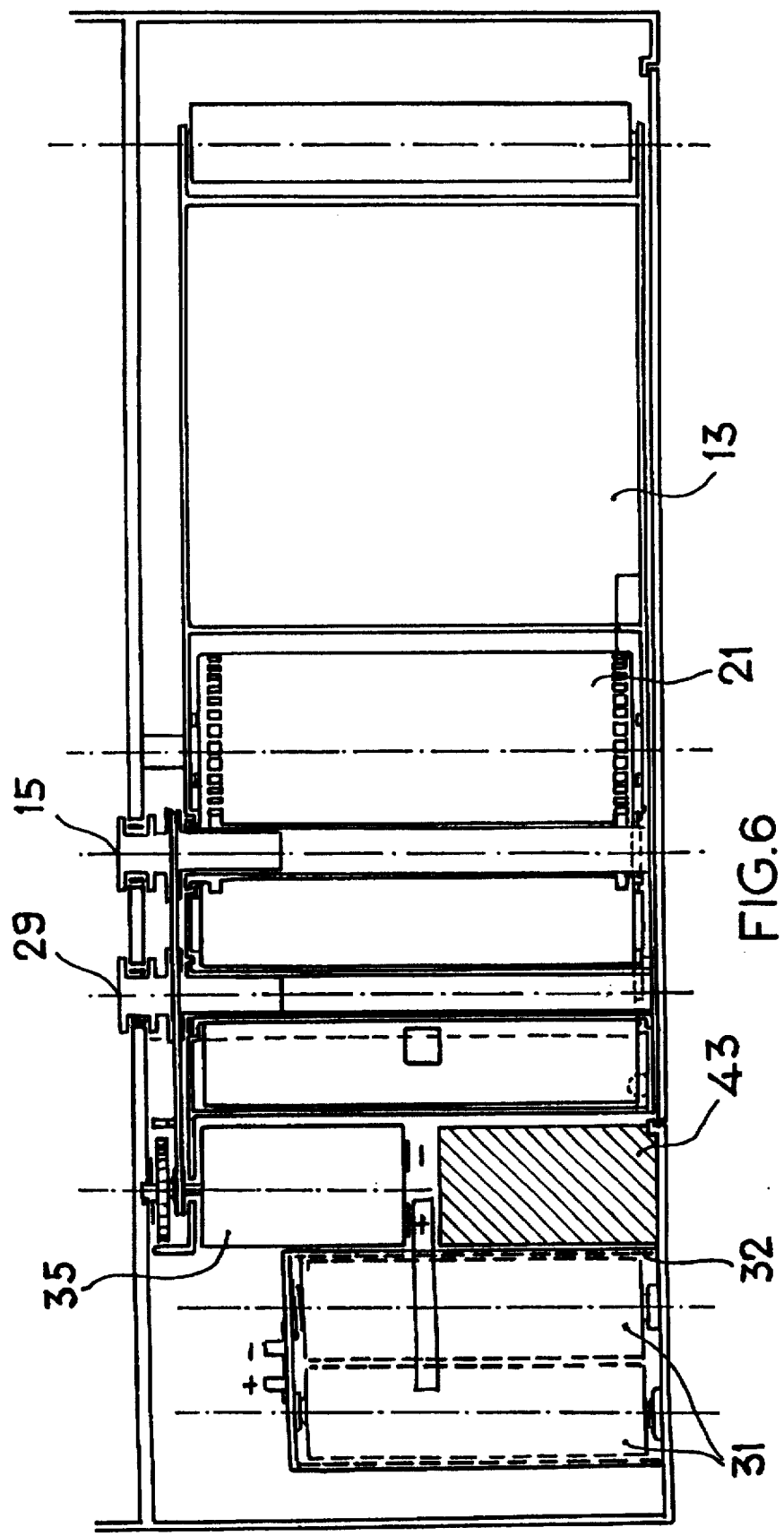

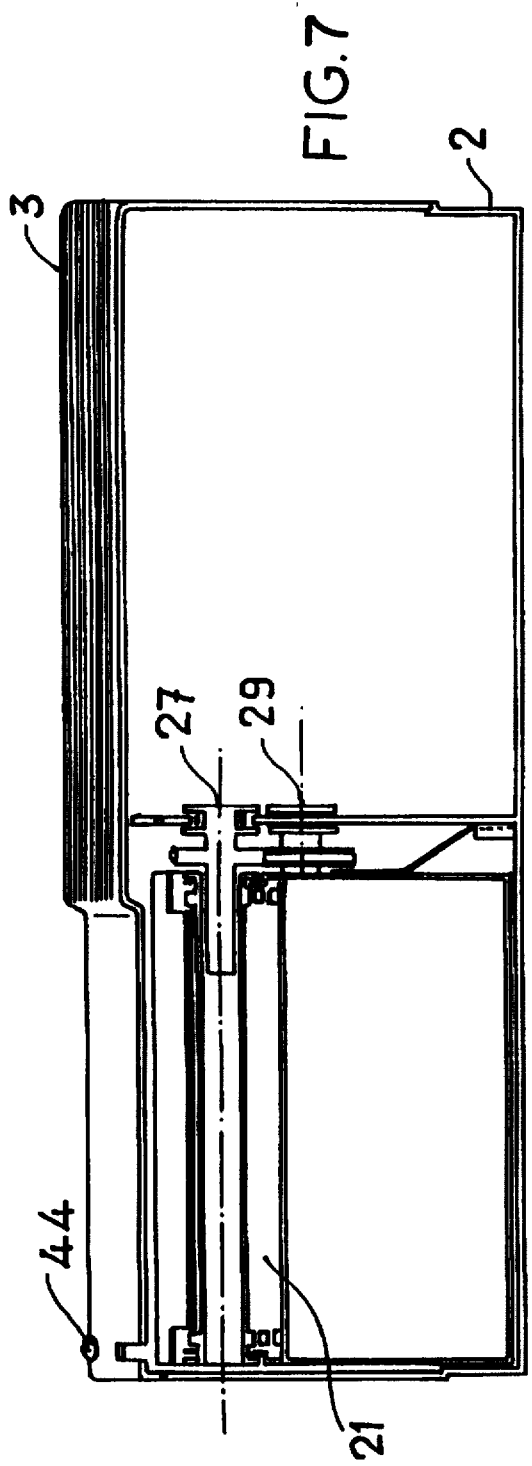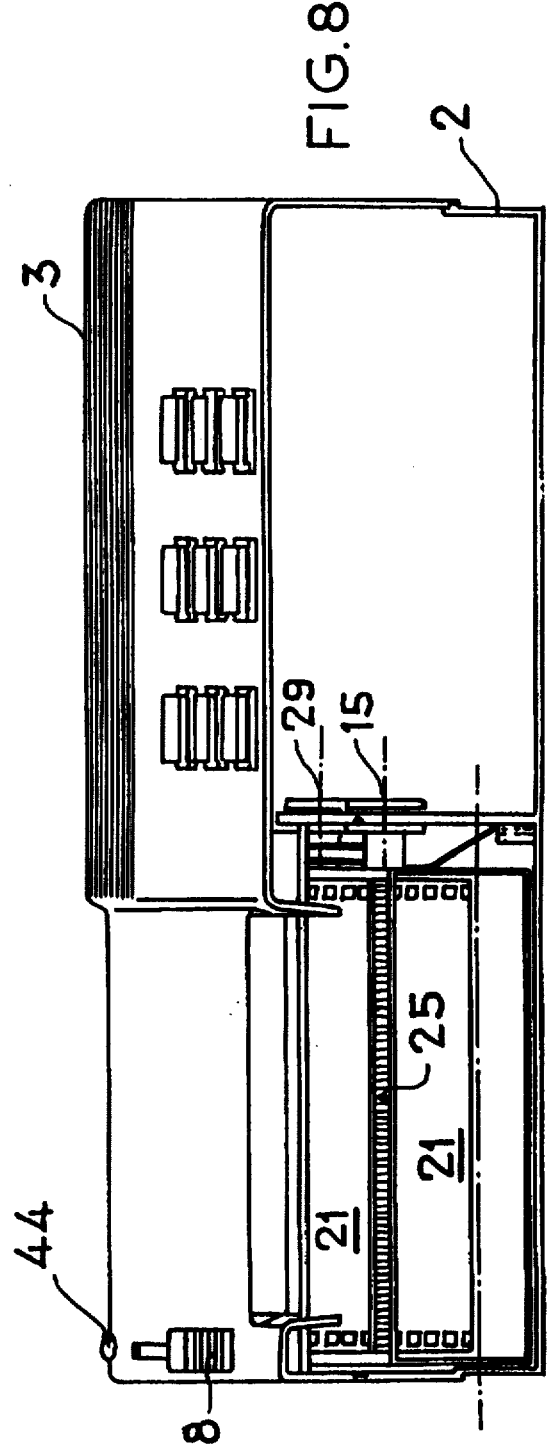

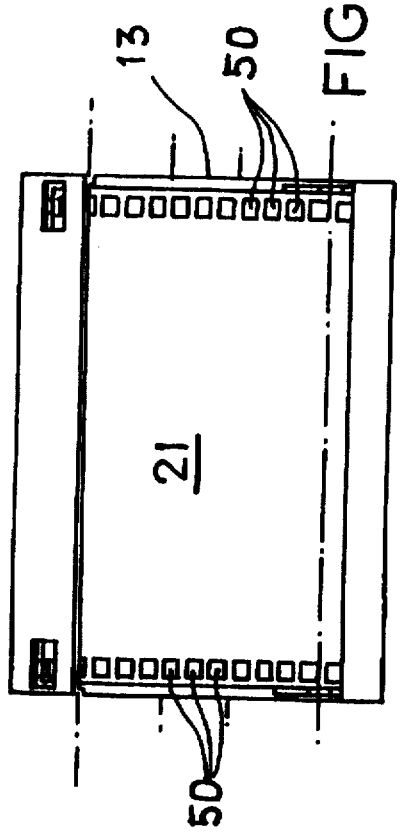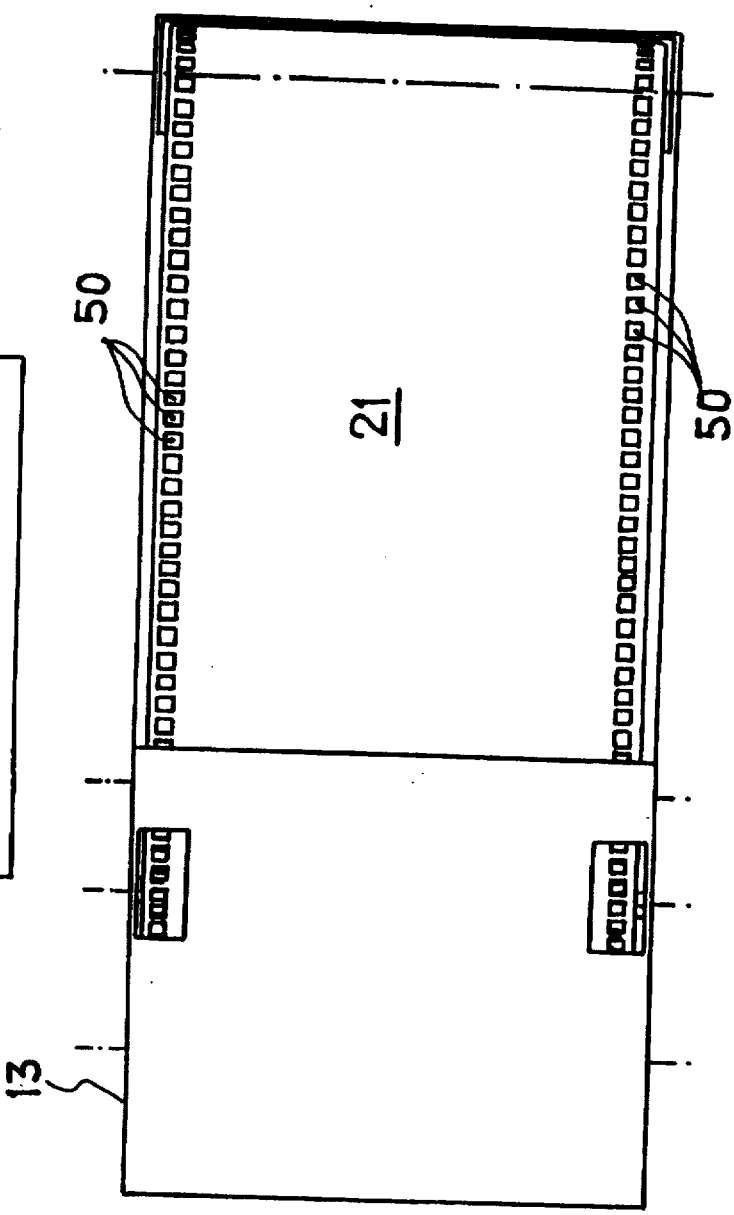

ANTISEPTIC TELEPHONE SET

CROSS-REFERENCE TO RELATED APPLICATION

This application is a continuation-in-part of application Ser. No. 08/232,060, filed as PCT/EP93/00070 Aug. 24, 1993, now abandoned.

BACKGROUND OF THE INVENTION

The invention relates to a telephone set similar to a common one actually used and commercialised for public and private use, with an additional characteristic that allows for the cleaning and disinfection of both of the hearing and speaking areas of the telephone receiver, before the user comes into contact with it.

This additional characteristic was achieved by adding in the case of telephones (private or public), under the area where the receiver is placed, a cleaning device according to the present invention, with the corresponding modifications to allow for its installation.

Due to the above, it can be concluded that a new type of hygienic and antiseptic telephone was developed, as a result of this invention, which was not existing until now.

The rest of the telephone set remains unchanged, and allows for the installation of its communication electrical components.

SUMMARY OF THE INVENTION

Accordingly, an object of the present invention is to provide an antiseptic telephone set, public or private, which, in addition to its main purpose of communication, also allows for the effective cleaning and disinfection of the speaking and hearing areas of the receiver thereof in an easy and simple manner to prevent the contamination by diseases.

Briefly, in accordance with the present invention, there is provided a telephone set for telephone communications which includes cleaning and disinfecting means for the speaking and hearing areas of the receiver, particularly, the earpiece and microphone thereof. The telephone case is preferably fabricated from plastic and includes therein components of a mechanical system for providing the cleaning, which includes a cassette or cartridge having two reels, a supply reel having a cleaning cloth impregnated with disinfectant liquid wound thereon and a receiving reel onto which the cleaning cloth is wound after it has passed across the cleaning window provided in the telephone case in the recess housings for receiving the speaking and hearing areas. The speaking and hearing areas are cleaned by friction as the cleaning cloth is displaced either manually or electrically from the supply reel to the receiving reel. The cassette or cartridge is either of the disposable type or of the continuous use type.

BRIEF DESCRIPTION OF THE DRAWINGS

In the drawings:

FIG. 3 is an end view of the telephone set showing the receiver slightly raised above the base;

FIG. 4 shows a sectional view of the base taken substantially along line 4—4 of FIG. 1, and also shows the receiver raised above the base;

FIG. 5 shows a section view of the base taken substantially along line 5—5 of FIG. 1, and also shows the receiver raised above the base;

FIG. 6 is a sectional view taken substantially along line 6—6 of FIG. 4;

FIG. 7 is a section view taken substantially along line 7—7 of FIG. 4;

FIG. 8 is a sectional view taken substantially along line 8—8 of FIG. 4;

FIG. 11 is a right end view of the cassette or cartridge shown in FIG. 9;

FIG. 12 is a top plan view of the cassette or cartridge shown in FIG. 9;

DESCRIPTION OF THE PREFERRED EMBODIMENT

Figure 1:
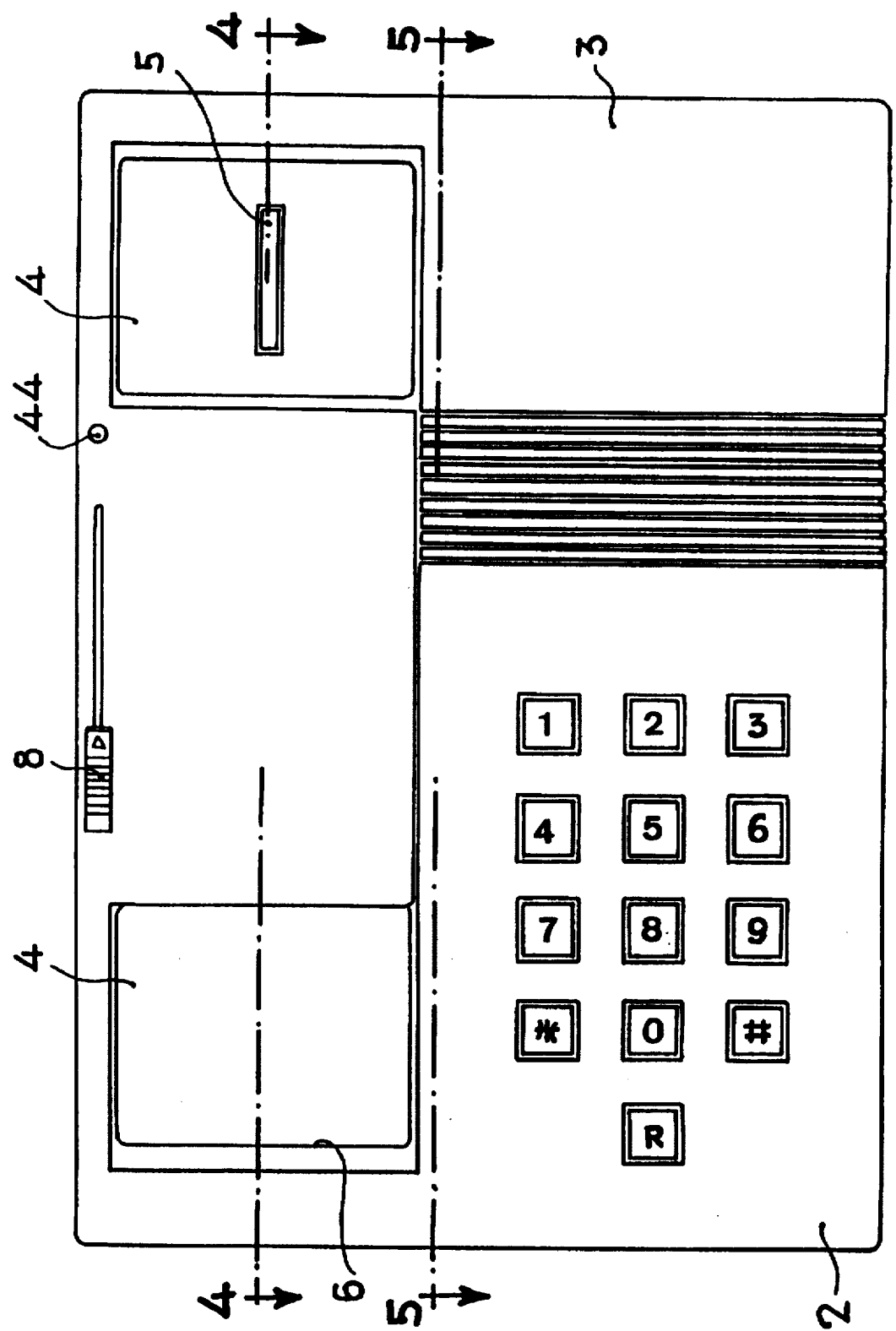
FIG. 1 is a top plan view of the base of the telephone set.
Figure 2:
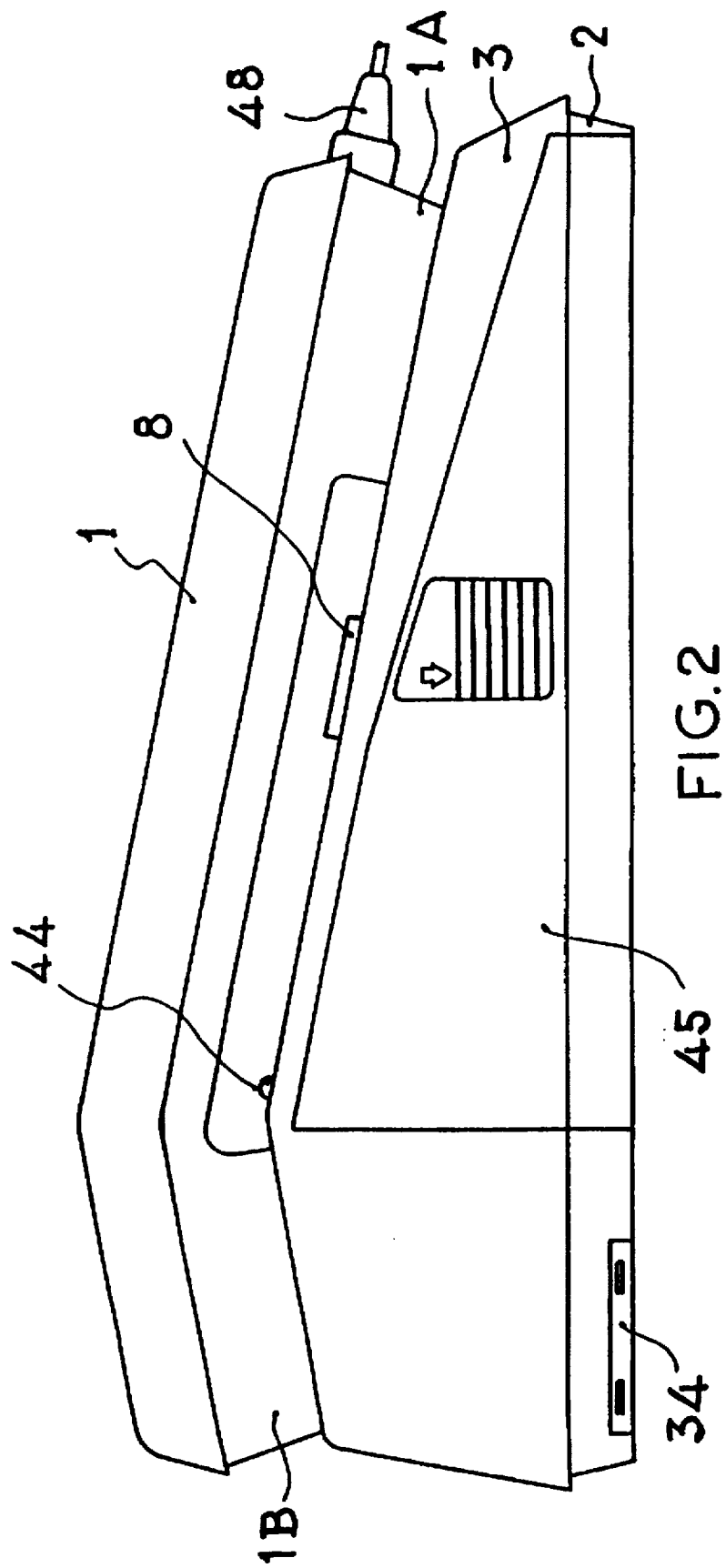
FIG. 2 is a side elevational view of the telephone set showing the receiver and the base thereof.
Figure 9:
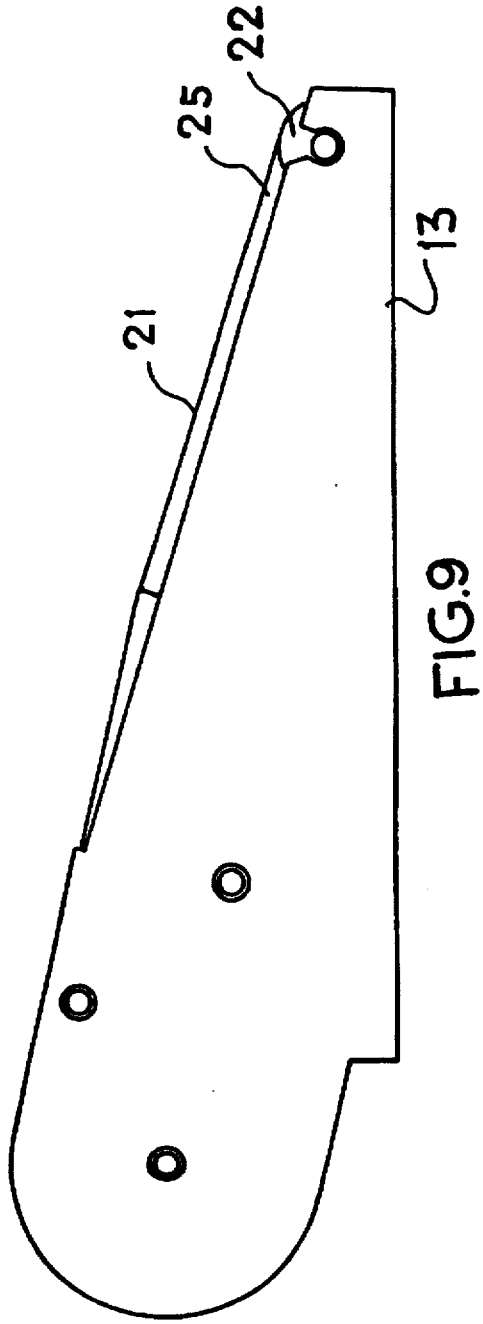
FIG. 9 is a side view of a disposable cassette or cartridge.

Referring now to the drawings, FIGS. 1, 2 and 3 show a telephone set having a conventional receiver 1 and a base 2 therefor, the base 2 being provided with a cover 3, pursuant to the present invention. A conventional receiver cable 48 connects the receiver 1 to the base 2 in a conventional manner, well known in the art. The cover 3 has receiver housings 4 in the top portion thereof to provide recesses for receiving the speaking portion 1A and the hearing portion 1B of the receiver 1. A conventional line cut-off switch 5 is provided in one of the receiver housings 4, such as in the receiver housing 4 which receives the hearing portion 1B of the receiver 1.

In accordance with the present invention, at least one of the receiver housings 4, such as the receiver housing 4 which receives the speaking portion 1A, as shown in FIGS. 4 and 5, is provided with a cleaning window 6 to provide an opening through the cover 3 into the interior thereof. The cleaning window 6 is provided with a sliding cover 7, as best shown in FIGS. 4 and 5, for protection thereof from possible external pollution and to also avoid evaporation of the antiseptic liquid disposed within the cover 3, as will be discussed below. A sliding pin 8 shown in FIGS. 1-3 is connected to the cover 7 for sliding the cover 7, as indicated in FIG. 4.

Figure 10:
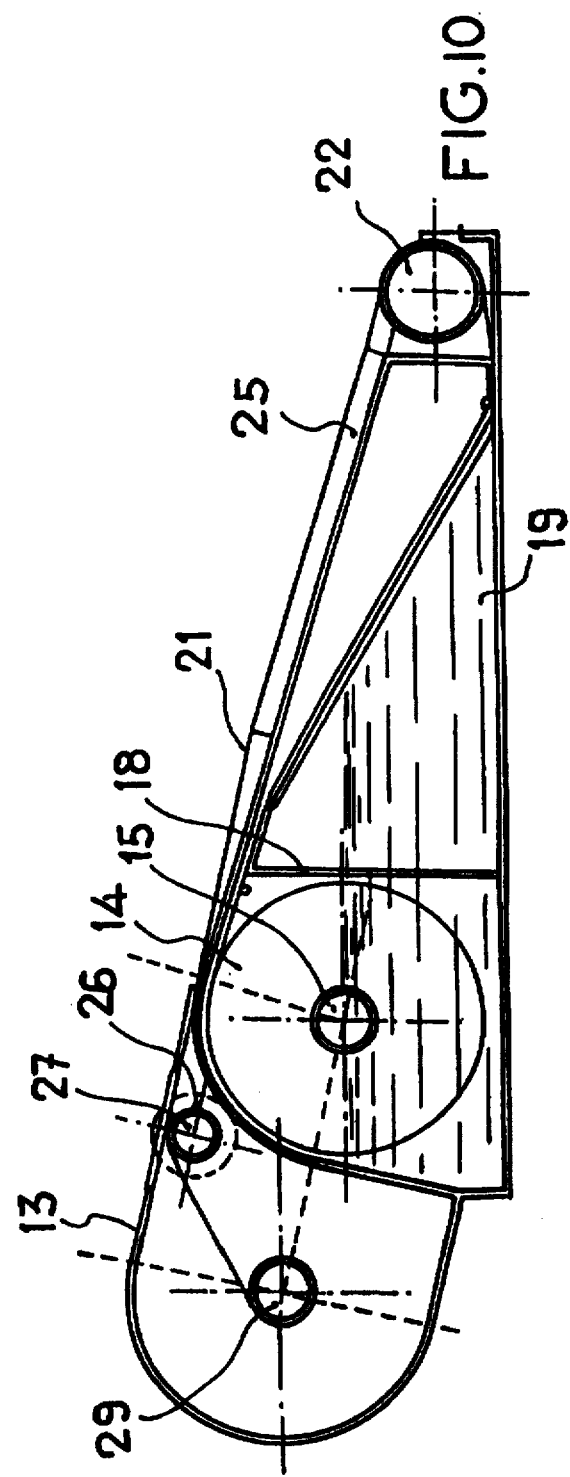
FIG. 10 is a cross-sectional view taken through the cassette or cartridge of FIG. 9.
Figure 13:
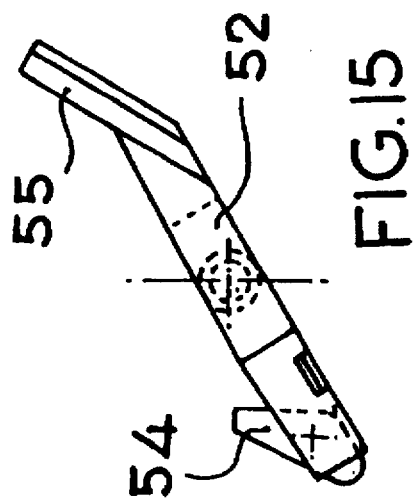
FIGS. 13 and 14 show a unidirectional gear for a manual system.
Figure 15:
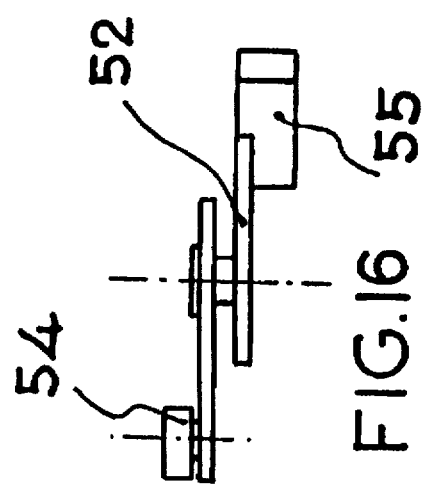
FIGS. 15 and 16 show a lever for actuating the unidirectional gear of FIGS. 13 and 14.
Figure 14:
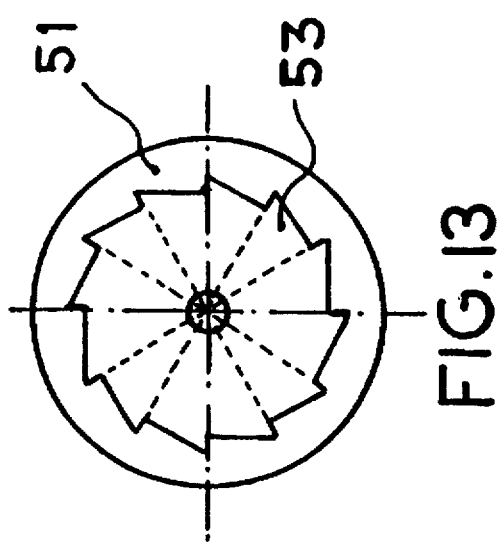
Figure 16:
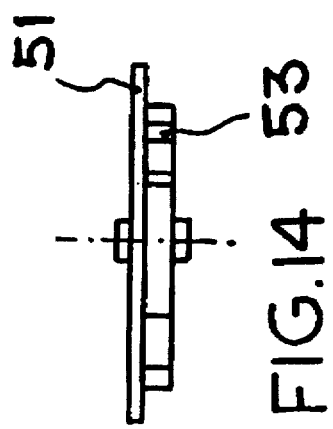

A cartridge or cassette 13, which may be of the disposable type or not, such as the continuous use type, is best shown by itself in FIGS. 9-12. Referring to FIGS. 4 and 10, the cartridge or cassette 13 includes three independent compartments. The first compartment houses the emission or supply reel 14 for the cleaning baize, cloth or fabric 21 mounted on the reel shaft 15. The second compartment is for the recovery of the used baise or cloth 21 on the recovery or receiving reel 28 mounted on the recovery reel shaft 29. The third compartment is a reservoir 18 for the antiseptic liquid 19 in which the baize 21 is soaked when passing therethrough. As indicated in FIGS. 4 and 10, the cleaning baize or fabric 21 is unwound from the emission reel 14, passes through the antiseptic liquid 19 and then extends around the guide reel 22. The cleaning baize 21 then passes under the cleaning window 6 to the traction reel 26 on the traction shaft 27, and is then wound or rolled up onto the recovery reel 28.

As best indicated in FIGS. 11 and 12, the cleaning baize 21 is provided with perforations 50 on the opposite sides thereof to receive the teeth of the traction shaft 27 to facilitate the movement of the cleaning baize 21. Additionally, a pressure foam pad 25 is placed outside the cartridge or cassette 13 but under the baize 21 as indicated in FIGS. 4 and 5. The pressure foam pad 25 exactly matches the cleaning window 6 and is placed therein when the cartridge or cassette 13 is positioned in the base 2. Accordingly, the foam pad 25 counterbalances the weight of the speaking or hearing portions 1A and 1B when these portions come in contact with the baize 21 for the cleaning thereof. Furthermore, the foam pad 25 positions the baize 21 to conform to the shape or configuration of the speaking and hearing portions 1A and 1B of the receiver 1 for a matching engagement therebetween. Thus, the baize 21 passes across the cleaning window 6 in a frictional contact with the speaking and hearing portions 1A and 1B of the receiver 1 for the cleaning thereof.

It is noted, as best shown in FIG. 2, that the base 2 is provided with a basculating cover 45 on one side thereof to allow for the extraction and replacement of the disposable cartridge or cassette 13 therein. Furthermore, as shown in FIG. 5, an ejection spring 46 is provided for the extraction of the disposable cartridge or cassette 13. Additionally, as best shown in FIGS. 1 and 4, an indicator light 44 is provided on the cover 3 of the base 2 to indicate (1) when the cleaning baize 21 has been completely unwound from the emission reel 14 or (2) when there is an obstruction in the baize system, where in both cases the emission reel 14 can no longer rotate. The electrical circuitry for the indicator light 44 is therefore associated with the emission reel 14, and would be obvious to one skilled in the art. In that the electrical circuitry can be arranged in many different ways, a specific showing thereof in the drawings is not thought necessary.

It is noted, that the cleaning baize 21 can be driven from the emission reel 14 to the recovery reel 28, either electrically or manually. Accordingly, the electrical system will be discussed first below. In the electrical system, an electric motor 35 is used, where the electric motor 35 preferably operates on three volts. Obviously, the source of the electrical current can be obtained from the telephone line, from an external power source, or from two 1.5 volt batteries 31, as described below.

Referring now to FIGS. 4, 5 and 6, the base 2 is provided with a battery housing cover 34 to allow for the exchange of the batteries 31 therein. The batteries 31 energize the motor 35 at a predetermined time. Preferably, the motor 35 is energized when the sliding cover 7 uncovers the cleaning window 6, which can be performed by the sliding cover 7 contacting a conventional motor switch or stop 9, which can function as a motor switch, in a manner well known in the art. It is noted, that the sliding cover 7 is usually open only for a short period of time, normally, only when the receiver 1 is being cleaned and disinfected.

The activated motor 35 of the motor electric control system 43 rotates the reducing gears 37 mounted within the reducing mechanism case 36, so that the transmission pulley 38 connected thereto is rotated. As best shown in FIG. 5, a transmission endless rubber band 42 drivingly connects the transmission pulley 38 to the traction pulley 39 and the sliding pulley 40, where a tensioner 41 is disposed against an outer surface of the endless rubber band 42 for tensioning same. It is noted, as indicated in FIGS. 6–8, that the traction pulley 39 engages with the traction shaft 27, and the sliding pulley 40 engages with the recovery reel shaft 29.

Accordingly, when the transmission pulley 38 rotates the endless rubber band 42, the endless rubber band 42 in turn rotates the traction pulley 39 and the sliding pulley 40 therewith, as indicated in FIG. 5, so that the traction pulley 39 rotates the traction shaft 27 to rotate the traction reel 26 and, at the same time, the sliding pulley 40 rotates the recovery reel shaft 29 to rotate the recovery reel 28. Thus, the rotation of the traction reel 26 and the recovery reel 28 causes the cleaning baize 21 to unwind from the emission reel 14 and to wind up onto the recovery reel 28, where the cleaning baize 21 passes across the cleaning window 6 to clean and disinfect the speaking or hearing portions 1A, 1B of the receiver 1. After a sufficient time, the user closes the sliding cover 7, which disengages the motor switch 9 and deactivates the motor 35 to stop the baize 21, where the user can repeat the above procedure when desired.

Referring to FIGS. 13–16, the manual system according to the present invention will now be discussed. The manual system is provided with mechanical components, including a unidirectional traction gear 51, shown in FIGS. 13 and 14, and an externally exposed lever 52, shown in FIGS. 15 and 16. The lever 52 is mounted on the traction shaft 27, and the traction gear 51 is mounted on the recovery reel shaft 29. Accordingly, the traction gear 51 is provided with a stepped cam or ratchet wheel 53 and the lever 52 is provided with a pawl 54 which is received in the ratchet wheel 53 to provide unidirectional motion of the traction gear 51. It is noted, that the traction gear 51 is reversed when mounted so that the ratchet wheel 53 is on the same side as the pawl 54 to permit proper engagement therebetween. A finger pad 55 is provided on the opposite side of the lever 52, where the finger pad 55 extends outside of the cover 3 in a manner similar to the sliding pin 8, so that same can be manually depressed by the user, where the arrangement of the finger pad 55 outside the cover 3 would be obvious to one skilled in art and therefore a showing thereof in the drawings is not thought necessary.

In operation, when the user wishes to clean and disinfect the telephone receiver 1, the user first opens the sliding cover 7, and then depresses the finger pad 55 of the lever 52 in a clockwise direction, so that the pawl 54 engages the ratchet wheel 53 to rotate same unidirectionally. At the same time, the lever 52 rotates the traction shaft 27 to rotate the traction reel 26 and unwind the baize 21 from the emission reel 14; and also the traction gear 51 rotates the recovery reel shaft 29 to rotate the recovery reel 28, so that the cleaning baize 21 is wound up onto the recovery reel 28 while passing across the cleaning window 6 to frictionally engage and clean the speaking or hearing portions 1A, 1B of the receiver 1. It is noted, that the user can depress the finger pad 55 as many times as required in order to clean and disinfect the receiver 1.

Figure 17:
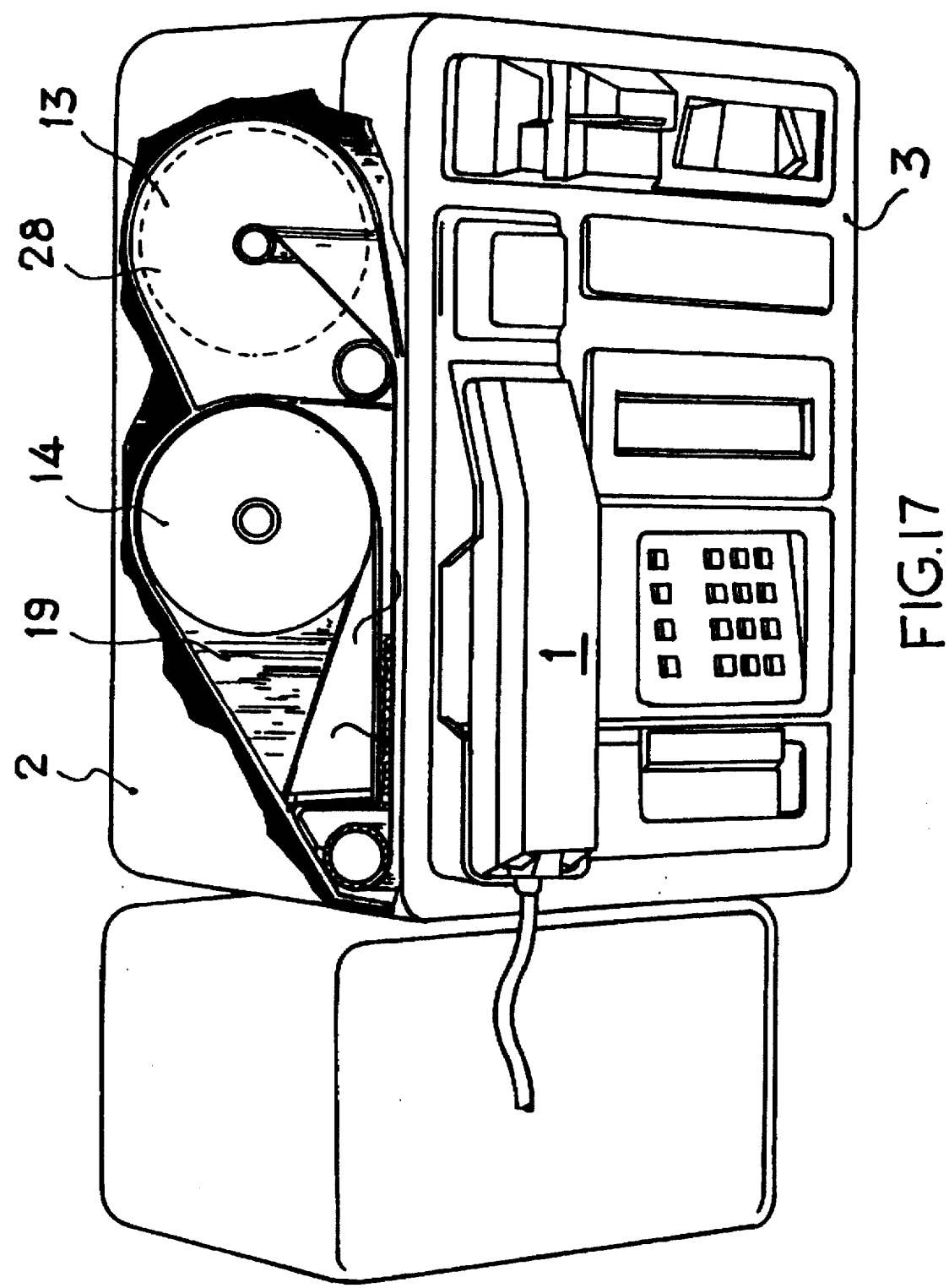
FIG. 17 shows a fragmented perspective view of another type of telephone set.
Figure 18:
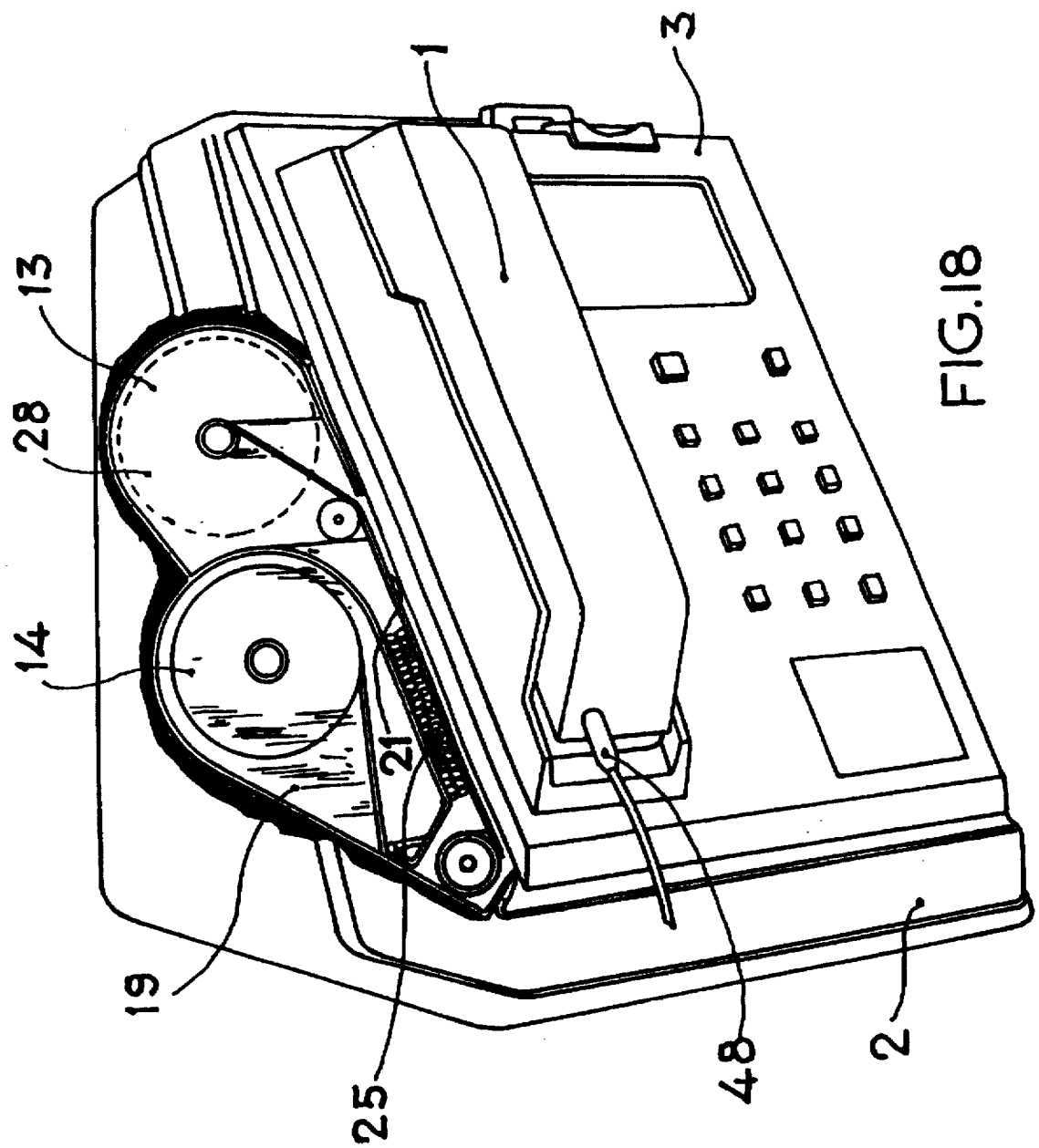
FIG. 18 shows a fragmented perspective view of still another type of telephone set.
Figure 19:
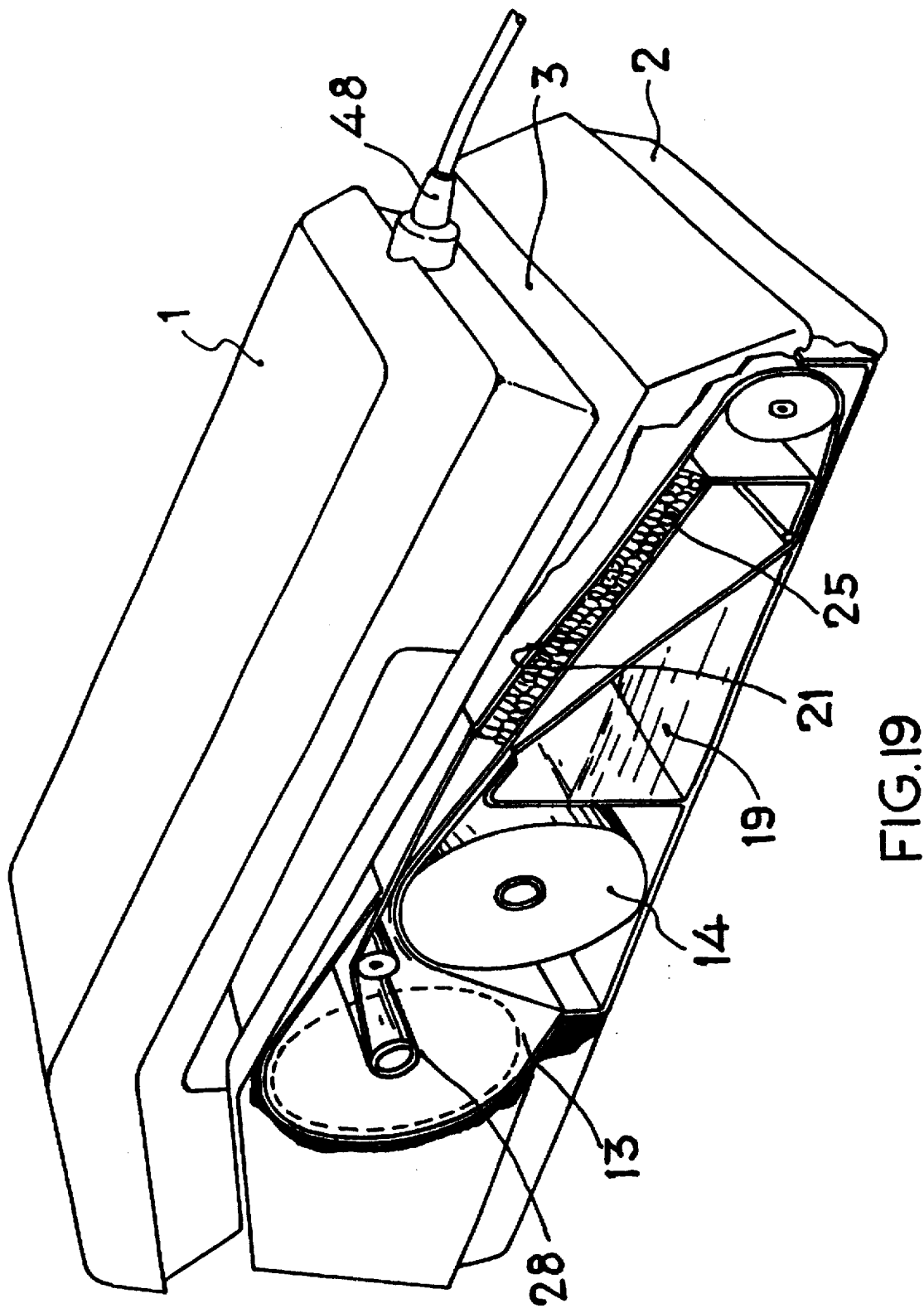
FIG. 19 shows a fragmented perspective view of yet another type of telephone set.

FIGS. 17, 18 and 19 show other types of telephone sets which can receive the cartridge or cassette 13 of the present invention therein in order to clean and disinfect the hearing and speaking portions of the telephone receiver 1, in the same manner as set forth above.

From the above, we can see that the cleaning will be performed on the speaking portion 1A or hearing portion 1B of receiver 1 when actuating the mechanism, either manual or electrical, where it makes the cleaning baize 21 in the disposable cartridge 13 unwind from the emission reel 14 to the recovery reel 28, after passing by the cleaning window 6, the place where the speaking or hearing portion 1A, 1B of receiver 1 is placed, thus performing the cleaning thereof when the baize 21 is in frictional contact with the receiver 1.

Amongst other advantages, it has the following:

1. It allows a considerable amount of cleanings, which will depend on the telephone case size, public or private, since this will determine all the other set components, such as the motor, cartridge etc., where the bigger the case size, the bigger amount of cleanings will be allowed. It is calculated that for the model TEIDE, commercialized by "TELEFONICA ESPANA" and used as a base of this project, it would allow for 100 cleanings approximately, an amount not too bad if we consider the small size of the case thereof.
2. The fact that the baize 21 is always soaked with an antiseptic even after used, since it is installed in the disposable cartridge 13, and also since the baize 21 is even more soaked when it passes from the one reel 14 to the other reel 28 through the antiseptic liquid reservoir 18 of cartridge 13. Therefore, the guaranty of efficiency and durability of the baize 21 cannot be bigger, since it will remain soaked while there is still liquid in the reservoir 18, which will allow for a long period of storage of stock cartridges; and
3. When the cartridge or cassette 13 is finished after being completely used, it can be easily replaced by another one purchased in any warehouse, drugstore or retail store.

At the sight of the foregoing, it may be deduced that the device of the present invention is efficient in the prevention of contamination of illness and disease (Hepatitis, Lung and Mouth diseases, Tuberculosis, AIDS, etc.) which can be obtained by mouth, ear or face contact with the receiver speaking and hearing areas if a good disinfection is not properly performed before another user comes in contact with it.

It is evident that the best way to avoid contagious illness is by prevention. Therefore, the limitation of contact with contagion factors is increasingly important in order to maintain the health of the population.

All this makes this new device of utmost importance in the maintenance of public health, since it contributes to avoid the risk that could exist for those persons which make use of telephones, which in general is the majority of the people. Therefore, it is important, due to the improvement in the quality of life which it brings.

The system of the present invention is mainly oriented to areas of public use (hospitals, hotels, restaurants, large commercial areas, etc.) to say nothing about its use in PUBLIC TELEPHONES in a lower scale, and without mentioning its importance to private telephones.

With regard to its manufacture, it does not represent any problem since all components, for private or public, are simple and low cost, most of the parts being plastic.

What is claimed is:

1. A telephone set for public or private communication, comprising:

a base;

a receiver having speaking and hearing portions;

said base being provided with housing means for receiving said speaking and hearing portions of said receiver;

said housing means including at least one housing having a window to provide an opening therethrough communicating with an interior of said base;

antiseptic means disposed within said interior of said base adjacent to said window for cleaning at least one of said speaking and hearing portions of said receiver when placed in said one housing; and reservoir means disposed within said interior of said base in a spaced arrangement from said window for containing an antiseptic liquid so that said antiseptic means cad pass through said antiseptic liquid prior to passing under said window.

2. A telephone set according to claim 1, wherein said base is provided with cover means disposed within said interior of said base for sliding across said window between said window and said antiseptic means to close said opening provided by said window to protect said antiseptic means from external pollution.

3. A telephone set according to claim 1, wherein said antiseptic means includes a cleaning cloth impregnated with said antiseptic liquid.

4. A telephone set according to claim 3, wherein pressure foam pad means are provided under said cleaning cloth to counterbalance weight of said one of said speaking and hearing portions, said pressure foam pad being sized to match size of said window.

5. A telephone set according to claim 3, wherein said base is provided with mechanical means for moving said cleaning cloth across said window in frictional contact with said one of said speaking and hearing portions.

6. A telephone set according to claim 5, wherein said mechanical means are activated by electrical components.

7. A telephone set according to claim 6, wherein said electrical components include a motor to provide movement to said mechanical means, and battery means for energizing said motor.

8. A telephone set according to claim 5, wherein said mechanical means are activated manually by a lever.

9. A telephone set according to claim 3, wherein said cleaning cloth is disposed in a cartridge mounted within said interior of said base.

10. A telephone set according to claim 9, wherein said cartridge includes three compartments, a first compartment houses a supply reel on which said cleaning cloth is wound, a second compartment houses a receiving reel for recovery of said cleaning cloth after use thereof, and a third compartment houses said reservoir means containing said antiseptic liquid in which said cleaning cloth is soaked when passing through said third compartment prior to use thereof.

11. A telephone set according to claim 10, wherein said receiving reel is rotated by electrical components.

12. A telephone set according to claim 11, wherein said electrical components include a motor to provide movement to said receiving reel, and battery means for energizing said motor.

13. A telephone set according to claim 12, wherein said base includes a battery housing for receiving said battery means, and a cover for closing said battery housing.

14. A telephone set according to claim 10, wherein said receiving reel is rotated by a manually operated lever.

15. A telephone set according to claim 14, wherein said lever coacts on a ratchet wheel to provide unidirectional motion to said receiving reel.

16. A telephone set according to claim 10, including indicator means for indicating when said cleaning cloth in said cartridge is completely used.

17. A telephone set according to claim 10, wherein said cleaning cloth is provided with perforation means along opposite longitudinal sides for coacting with said supply and receiving reels for movement thereof.

18. A telephone set according to claim 9, wherein said cartridge is a disposable cartridge, said base including means to permit said cartridge to be replaced.

19. A telephone set according to claim 18, including indicator means for indicating when said cartridge should be replaced.

20. A telephone set according to claim 18, wherein said base has closable cover means on one side thereof for providing an opening in said base to permit said cartridge to pass through for replacement thereof.

21. A telephone set for public or private communication, comprising:

a base;

a receiver having speaking and hearing portions;

said base being provided with housing means for receiving said speaking and hearing portions of said receiver;

said housing means including at least one housing having a window to provide an opening therethrough communicating with an interior of said base;

antiseptic means disposed within said interior of said base adjacent to said window for cleaning at least one of said speaking and hearing portions of said receiver when placed in said one housing;

said antiseptic means including a cleaning cloth;

said base including first compartment means for housing a supply reel on which said cleaning cloth is wound, second compartment means for housing a receiving reel for recovery of said cleaning cloth after use thereof, and third compartment means for housing a reservoir of antiseptic liquid means for soaking said cleaning cloth as said cleaning cloth passes through said antiseptic liquid means prior to passing under said window.

22. A telephone set according to claim 21, wherein said base is provided with cover means disposed within said interior of said base for sliding across said window between said window and said cleaning cloth to close said opening provided by said window to protect said cleaning cloth from external pollution.

23. A telephone set for public or private communication, comprising:

a base;

a receiver having speaking and hearing portions;

said base being provided with housing means for receiving said speaking and hearing portions of said receiver;

said housing means including at least one housing having a window to provide an opening therethrough communicating with an interior of said base;

antiseptic means disposed within said interior of said base adjacent to said window for cleaning at least one of said speaking and hearing portions of said receiver when placed in said one housing;

said antiseptic means including a cleaning cloth;

reservoir means disposed within said interior of said base in a spaced arrangement from said window for containing an antiseptic liquid so that said cleaning cloth can pass through said antiseptic liquid prior to passing under said window;

pressure foam pad means being provided adjacent said window under said cleaning cloth to counterbalance weight of said one of said speaking and hearing portions;

said base being provided with cover means disposed within said interior of said base for sliding across said window between said window and said antiseptic means to close said opening provided by said window to protect said antiseptic means from external pollution and to also avoid evaporation of said antiseptic liquid; and pin means connected to said cover means for sliding said cover means back and forth across said window.

* * * * *